(12) United States Patent
Inohara et al.

(10) Patent No.: US 7,231,401 B1
(45) Date of Patent: Jun. 12, 2007

(54) METHOD AND APPARATUS FOR IMPLEMENTING EXTENSIBLE NETWORK-ATTACHED SECONDARY STORAGE

(75) Inventors: Shigekazu Inohara, Kokubunji (JP); Itaru Nishizawa, Kodaira (JP); Naoki Watanabe, Kodaira (JP); Aki Tomita, Tachikawa (JP); Frederico Buchholz Maciel, Kokubunji (JP); Hiroaki Odawara, Kodaira (JP); Nobutoshi Sagawa, Koganei (JP); Mamoru Sugie, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/416,961

(22) Filed: Oct. 13, 1999

(30) Foreign Application Priority Data

Oct. 15, 1998 (JP) ............................... 10-293277

(51) Int. Cl.
*G06F 17/30* (2006.01)
(52) U.S. Cl. ................................. 707/104.1
(58) Field of Classification Search ............... 707/204, 707/10, 1, 2, 104.1; 711/113, 117; 712/300; 704/7; 713/200; 719/315; 709/203
See application file for complete search history.

(56) References Cited

U.S. PATENT DOCUMENTS

| 4,638,424 A * | 1/1987 | Beglin et al. ............... 711/117 |
| 5,386,578 A * | 1/1995 | Lin ............................. 712/300 |
| 5,640,556 A * | 6/1997 | Tamura ........................ 707/10 |
| 5,680,570 A * | 10/1997 | Rantala et al. ............... 711/113 |
| 6,275,938 B1 * | 8/2001 | Bond et al. .................. 713/200 |
| 6,285,978 B1 * | 9/2001 | Bernth et al. .................. 704/7 |
| 6,549,954 B1 * | 4/2003 | Lambrecht et al. ......... 719/315 |
| 2001/0003824 A1 * | 6/2001 | Schnier ...................... 709/203 |

OTHER PUBLICATIONS

"A Cost-Effective, High-Bandwidth Storage Architecture" by G. Gibson, et al pp. 1-12, no date.
"The Global File System" by R. Soltis, et al pp. 1-23, no date.
"Active Disks-Remote Execution for Network -Attached Storage" by Erik Riedel, pp. 1-13, no date.
"Active Disks: Programming Model, Algorithms and Evaluation" by A. Acharya, et al pp. 81-91, no date.
"A Case for Intelligent Disks (IDISKs)" by K. Keeton, et al pp. 1-11, no date.
"The Java Language Specification" by J. Gosling et al pp. 1-6, no date.
"The New Frontiers" by U. Vahalia, et al pp. 262-267, no date.

* cited by examiner

*Primary Examiner*—Etienne P LeRoux
(74) *Attorney, Agent, or Firm*—Mattingly, Stanger, Malur & Brundidge, P.C.

(57) ABSTRACT

A storage comprising an object access module for the shared part for implementing advanced I/O provides an interface (121) for registering and deleting object description data declaring how to store objects within a second storage, in order to reduce the development cost of modules for implementing functions. Also, in order to reduce the total cost of ownership, modules are transferred to the storage through a management computer. The present invention allows the storage for contiguously providing functions effective to a vast range of applications to be provided with lower development cost as well as lower total cost of ownership.

6 Claims, 12 Drawing Sheets

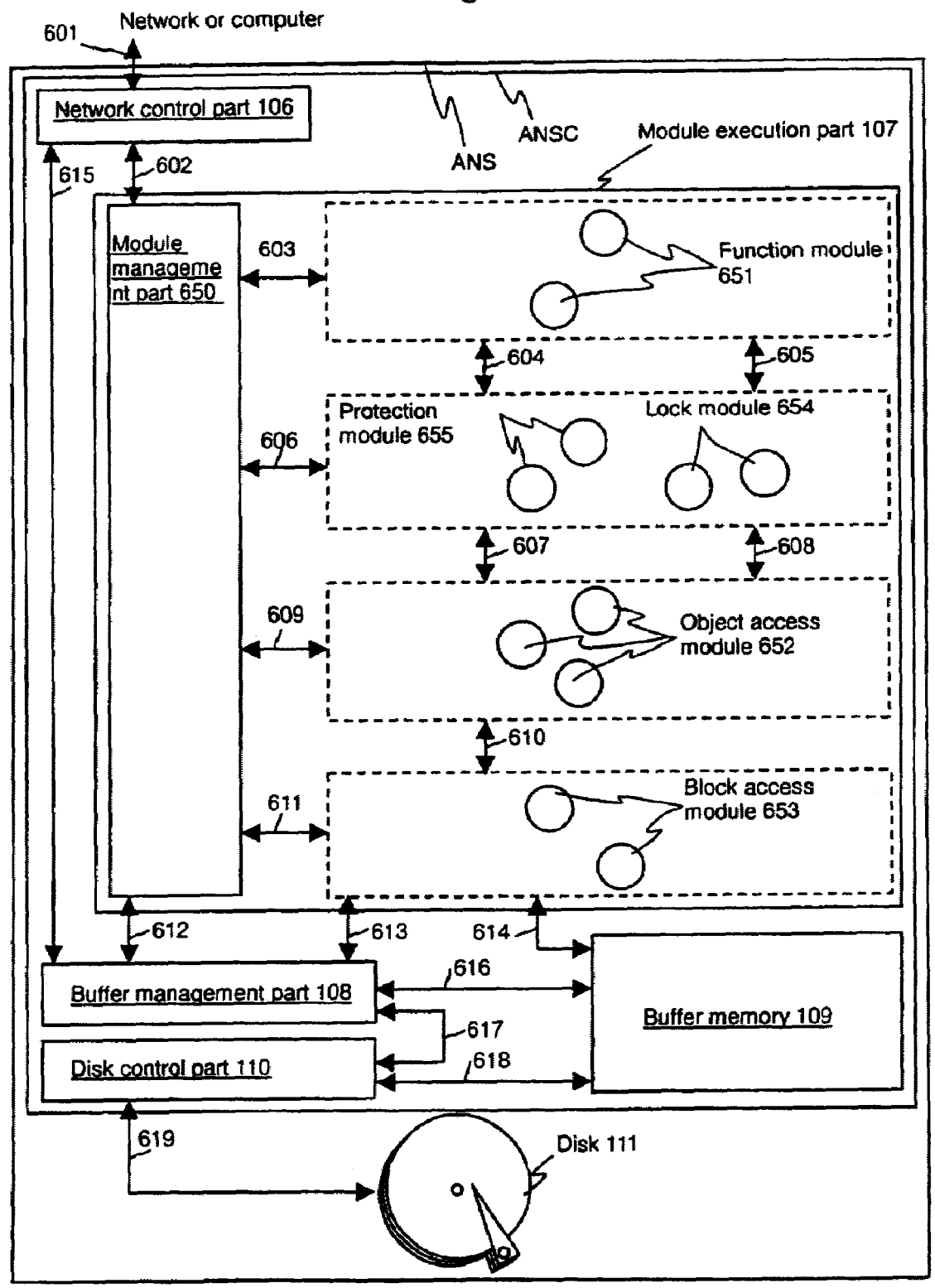

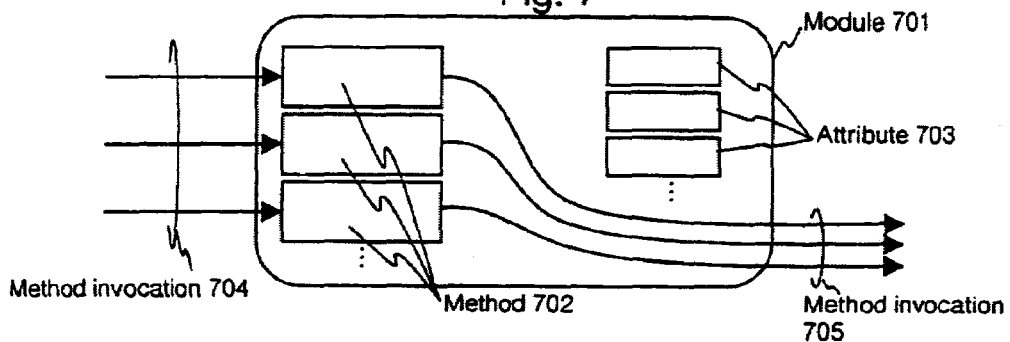
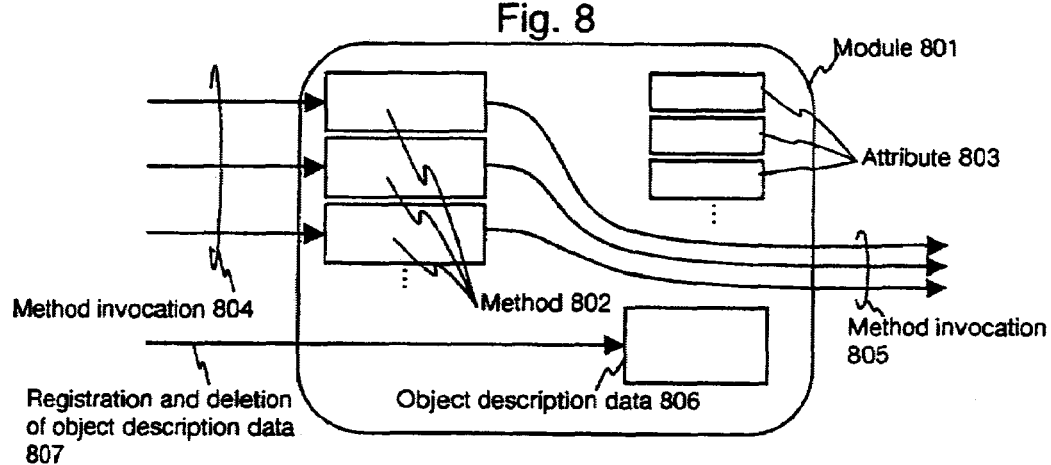
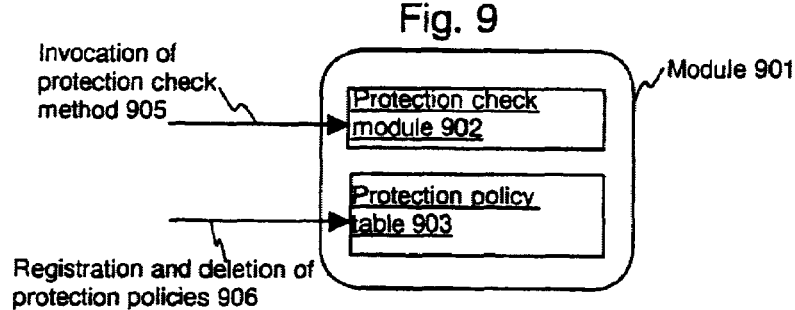

Fig. 10

Object description data (table form) 1001

| Tag 1002 | Type 1003 | Offset 1004 | Size 1005 | Count 1006 | Block type 1007 |
|---|---|---|---|---|---|
|  |  |  |  |  |  |
|  |  | ⋮ |  |  |  |

Fig. 11

UFS_inode object 1101

| Tag 1002 | Type 1003 | Offset 1004 | Size 1005 | Count 1006 | Block type 1007 |
|---|---|---|---|---|---|
| di_mode | short | 0 | 2 | 1 | null |
| di_nlink | short | 2 | 2 | 1 | null |
| di_uid | short | 4 | 2 | 1 | null |
| di_gid | short | 6 | 2 | 1 | null |
| di_size | long | 8 | 4 | 1 | null |
| di_addr1 | BLOCK | 12 | 3 | 10 | UFS_data |
| di_addr2 | BLOCK | 42 | 3 | 1 | UFS_indirect1 |
| di_addr3 | BLOCK | 45 | 3 | 1 | UFS_indirect2 |
| di_addr4 | BLOCK | 48 | 3 | 1 | UFS_indirect3 |
| di_gen | byte | 51 | 1 | 1 | null |
| di_atime | long | 52 | 4 | 1 | null |
| di_mtime | long | 56 | 4 | 1 | null |
| di_ctime | long | 60 | 4 | 1 | null |

UFS_data3 object 1102

| Tag 1002 | Type 1003 | Offset 1004 | Size 1005 | Count 1006 | Block type 1007 |
|---|---|---|---|---|---|
| data | byte | 0 | 1 | 4096 | null |

UFS_indirect13 object 1103

| Tag 1002 | Type 1003 | Offset 1004 | Size 1005 | Count 1006 | Block type 1007 |
|---|---|---|---|---|---|
| bid | BLOCK | 0 | 4 | 1024 | UFS_data |

UFS_indirect23 object 1104

| Tag 1002 | Type 1003 | Offset 1004 | Size 1005 | Count 1006 | Block type 1007 |
|---|---|---|---|---|---|
| bid | BLOCK | 0 | 4 | 1024 | UFS_indirect1 |

UFS_indirect3 object 1105

| Tag 1002 | Type 1003 | Offset 1004 | Size 1005 | Count 1006 | Block type 1007 |
|---|---|---|---|---|---|
| bid | BLOCK | 0 | 4 | 1024 | UFS_indirect2 |

Fig. 12

Object description data (parser form) 1201

| Tag 1202 | Initialization code 1203 |
|---|---|
| Context 1204 | Code 1205 |
| | |
| | |
| ⋮ | |

Fig. 13

```
create table customer (
        c_id            integer,
        c_name          char(40),
        c_address       varchar(100),
);
```
1301

132

| Tag 1202 | Initialization code 1203 |
|---|---|
| Context 1204 | Code 1205 |
| customer() | { record = 0; column = 0; } |
| (record())* | null |
| record() | { int saved_offset = offset; } |
| record_size = <long><br>c_id() c_name()<br>c_address() | { record++; column = 0;<br>  foundObject("record",<br>  record_size, saved_off,<br>  record); } |
| c_id() | null |
| value = <long> | { column++;<br>  foundObject("c_id",<br>  value, sizeof(long),<br>  record, column); } |
| c_name() | null |
| value = <char>[40] | { column++;<br>  foundObject("c_name",<br>  value, sizeof(char)*4,<br>  record, column); } |
| c_address() | null |
| column_size = <long><br>value =<br>  <char>[column_size] | { column++;<br>  foundObject("c_address",<br>  value, sizeof(char)*4,<br>  record, column); } |

Fig. 14

Object description data (pattern matching form) 1401

| File format 1402 | Tag 1403 | Pattern 1404 |
|---|---|---|
| shell_script | header1 | "#!" |
|  | header2 | "/bin/sh" |
| UNIX_executable | header1 | ZMAGIC II NMAGIC II OMAGIC |
| ⋮ | | |

Fig. 15

Protection policy description data 1501

| Sender 1502 | Receiver 1503 | Method 1504 | Allow/Deny 1505 |
|---|---|---|---|
| selectionModule | recordAccessModule | getObject("column") | Allow |
| selectionModule | blockAccessModule | getBlock() | Deny |
|  |  | ⋮ |  |

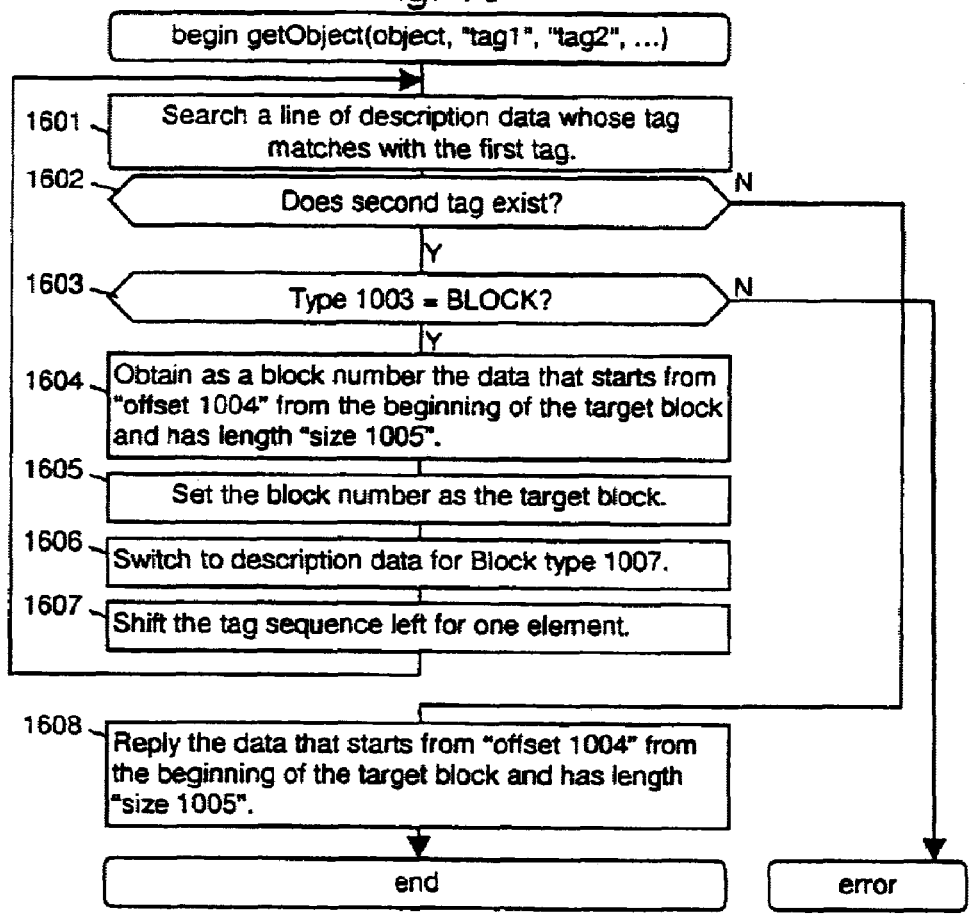
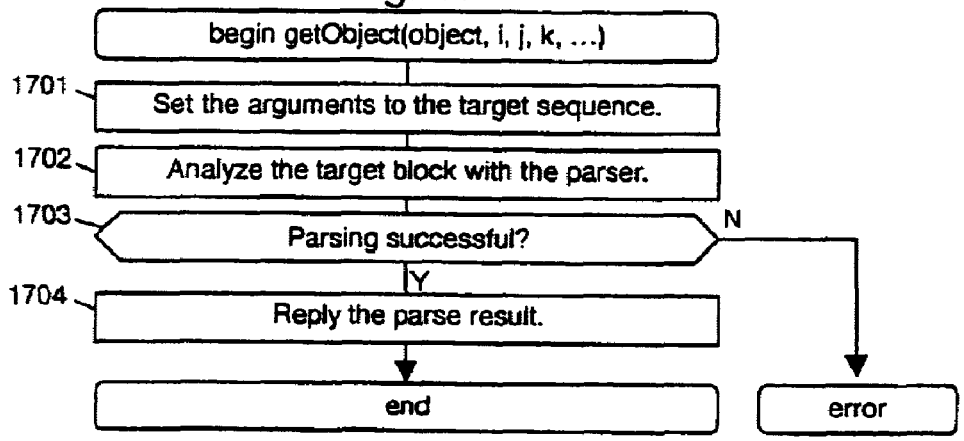

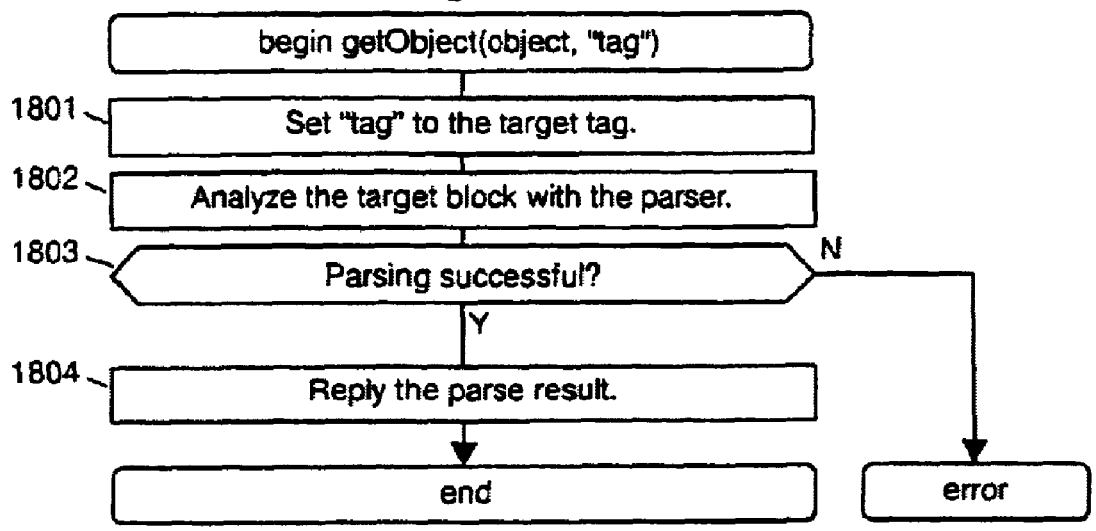
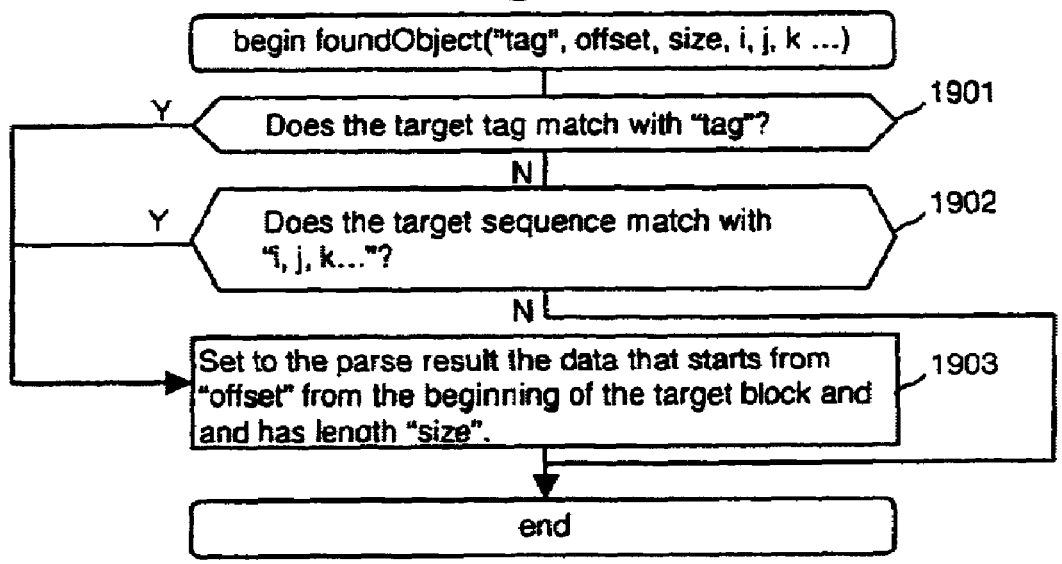

ANS management table 2201

| ANS name 2202 | Network address 2203 | Model 2204 | Compiler 2205 |
|---|---|---|---|
| disk1 | 123.123.11.1 | A corp. type 342 | compiler A |
| disk2 | 123.123.11.2 | B corp. type F01 | compiler B |
| | | ⋮ | |

METHOD AND APPARATUS FOR IMPLEMENTING EXTENSIBLE NETWORK-ATTACHED SECONDARY STORAGE

BACKGROUND OF THE INVENTION

1. Field of the Invention

The present invention relates to a computer system, more specifically to a method and an apparatus for implementing extensible secondary storage, suitable for application programs.

2. Description of the Related Art

Primary components in a modern computer system include computers (one computer comprises a processor, memory, and peripheral devices), a network, and a secondary storage. The storage heretofore was considered as a device attached to a computer, however the situation has been changed recently.

At first, there become common in recent years that a plurality of computers shares a single storage, because of the widespread usage of network. The processing power of the computer attaching the storage may become a bottleneck to cause storage input/output (I/O) from another computer through a network to be slowed down.

Secondly, The storage capacity and the throughput required for a storage increase from year to year. "Greg's law" anticipates that "the demand of the storage capacity for a data warehouse becomes double in nine months". As a result, the number of storages attached to a single computer may grow up so that the computer may become the bottleneck of the storage I/O.

Thirdly, since the number of transistors integrated in a hard disk controller LSI has been increased rapidly, the opportunity to realize a high-function storage has been increased.

By keeping in mind such situation as mentioned above, there has been proposed the addition of some new features to the storage controller LSI. Some candidates of these new features comprise a network interface and advanced function for the application programs.

By providing the storage with a network interface, the storage may be directly connected to the network. The storage thereby will be able to receive and process I/O requests from a plurality of computers without any hosting computer.

At present, the most popular interface between the storage and the computer is block I/O. By providing the storage with advanced features for every application such as sorting, image processing, and basic operations in a database system (such as selection processing, projection processing, concatenation, aggregation processing, and so on) instead of conventional block I/O, the storage will be able to cover part of processes performed by the processor in a computer.

Some exemplary storage proposed to feature a network interface and some part of a filesystem includes the system described in the paper by Garth A. Gibson et al., "A Cost-Effective, High-Bandwidth Storage Architecture" (Proceedings of the 8th Conference on Architectural Support for Programming Languages and Operating Systems, 1998, published by ACM; hereinafter reference #1), and the system described in the paper by Steven R. Soltis et al., "The Global Filesystem" (Proceedings of the Fifth NASA Goddard Space Flight Center Conference on Mass Storage Systems and Technologies, 1996, published by NASA; hereinafter reference #2).

Some exemplary high-function storage proposed in the assumption of plural applications includes the system described in the paper by Erik Riedel et al., "Active Disks: Remote Execution for Network-Attached Storage" (Technical Report CMU-CS-97-198, 1997, published by Carnegie Mellon University; hereinafter reference #3), the one described in the paper by Anurag Acharya, "Active Disks: Programming Model, Algorithms and Evaluation" (Proceedings of the 8th Conference on Architectural Support for Programming Languages and Operating Systems, 1998, published by ACM; hereinafter reference #4), and the one described in the paper by Kimberly Keeton et al., "A Case for Intelligent Disks (IDISKs)" (SIGMOD Record, Volume 27, Number 3, 1998, published by ACM; hereinafter reference #5).

The references #3 to #5 described the downloading from a computer to a storage of program modules that may achieve high function through the network. The languages proposed appropriate for writing such modules includes the language described in the paper by J. Gosling et al., "The Java Language Specification" (1996, Addison-Wesley; hereinafter reference #6).

Now, there will be described a server-attached disk (SAD), the conventionally exemplary storage, with reference to the accompanying FIG. 2.

A SAD 203 is usually connected to one computer 201 through an I/O cable 202. The storage may occasionally be connected to a plurality of computers. SAD 203 is comprised of a storage controller 204 and a disk 209, and the storage controller 204 constitutes of an interface control part 205, a buffer management part 206, buffer memory 207, and a disk controller 208.

The disk 209 is a storage medium (secondary storage) that can save data even after the shutdown of power. The control interface part 205 receives I/O requests and other transmissions sent from external devices through the I/O cable 202 and transmits the response to the requests, and other transmissions to the I/O cable 202. Buffer management part 206 controls the buffer memory 207. The buffer memory 207 temporarily saves data obtained from the disk 209. The disk controller 208 controls the disk to block read from and block write to the disk 209.

Interface 210 between the SAD 203 and the computer 201 provides input/output of block basis.

Reference is made to FIG. 3, the arrangement of a recently emerged storage, network-attached storage (NAS) will be described.

One or more of NAS 303 may be connected through a network 302 to one or more of computers 301, 301', etc. NAS 303 is comprised of a storage controller 304 and disk 309, and the storage controller 304 is comprised of a network controller 305, a buffer management part 306, buffer memory 307, and a disk controller 308.

The network controller 305 receives I/O requests and other transmissions sent from external devices through the network 302 and transmits the response to the requests, and other transmissions to the network 302. The disk 309, the buffer management part 306, the buffer memory 307, the disk controller 308 have their functions similar to the disk 209, the buffer management part 206, the buffer memory 207, and the disk controller 208, respectively.

NAS interface 310, the interface between NAS 303 and computers 301, 301', . . . , provides input/output of block basis.

Reference is now made to FIG. 4, the arrangement of Advanced SAD storage, which is the extended version of conventional SAD storage, will be described.

One or more of Advanced SAD storages 403 may usually be connected to one computer 401 through an I/O cable 402. In some cases it may be connected to a plurality of computers. The Advanced SAD storage 403 is comprised of a storage controller 404 and a disk 409, and the storage controller 404 is comprised of an interface control part 405, a buffer management part 406, buffer memory 407, a disk controller 408, and application-oriented function part 411.

The I/O cable 402, the interface control part 405, the buffer management part 406, the buffer memory 407, the disk controller 408, and the disk 409 provide the same functionality as the I/O cable 202, the interface control part 205, the buffer management part 206, the buffer memory 207, the disk controller 208, and the disk 209, respectively. The application-oriented function part 411 provides some advanced functions for specific applications, such as sorting, image processing, basic operations of a database system such as selection processing, projection processing, concatenation, and aggregation processing, and so on. High-function SAD interface 410 may have, in addition to block I/O, interface for making use of advanced processing provided by the application-oriented function part 411.

Reference is now made to FIG. 5 to describe the arrangement of a high-function NAS storage, which has been recently proposed.

One or more of high-function NAS storages 503 may usually be connected to one or more of computers 501, 501', etc. through a network 502. The high-function NAS storage 503 is comprised of a storage controller 504 and a disk 509, the storage controller 504 is comprised of a network controller 505, a buffer management part 506, buffer memory 507, a disk controller 508, and an application-oriented function part 411.

The network controller 505, the disk 509, the buffer management part 506, the buffer memory 507, and the disk controller 508 may have the same functionality as the network controller 305, the disk 309, the buffer management part 306, the buffer memory 307 and the disk controller 308, respectively.

The application-oriented function part 511 provides some advanced functions for specific applications, such as sorting, image processing, basic operations of a database system (such as selection processing, projection processing, concatenation, and aggregation processing, and so on). The high-function NAS interface 510 may have, in addition to block I/O, interface for making use of advanced processing provided by the application-oriented function part 411. The system described in reference #4 and the one described in reference #5 may download functions of the application-oriented function part 411 from external devices.

In order to achieve a storage which may directly connect to a network and provide high function, the most fundamental problem to be solved is that the storage is to contiguously provide functions effective to a vast range of application. If the range of application is sufficiently vast, that may lead to larger market, and then larger market may lead to some decrease of development cost and to some increase of development speed. Although there have been proposed a number of machines proprietary for database usage, these machines was difficult to have sufficient competitive power to survive among other multi-purpose machines using versatile devices, because these database-specific machines lacked sufficient range of versatility so that enough development cost was not invested.

In order to achieve storage contiguously providing functionality effective to a vast range of applications, there are three keys: higher extensibility of functionality, lower development cost of functionality, and higher cost performance ratio in the light of Total Cost of Ownership (TCO). More specifically these are the objects to be solved by the present invention.

In the Prior Art the extensibility has been considered as to downloading of advanced functions for every applications to the storage as needed, however, the development cost and TCO have not been sufficiently considered.

In the systems described in the references #1 and #2, the filesystem is created on the block access so that the application range will be limited. Although the system described in the reference #3 is considered as to provide a plurality of advanced functions, the way to provide these functions is unknown. The reference #4 proposes a plurality of advanced functions achieved on the software layer in the proximity of conventional operating system (OS). However the structure of the software corresponding to the conventional OS is different in every application. For example, a relational database management system (RDBMS) do not use filesystem provided by OS. Thus RDBMS do not require a filesystem. This means that even if a conventional software layer was directly applied to a storage, it might be difficult to address such vast range of application to be covered by the storage. The system described in the reference #5 is still in its designing step, however intends to use with RDBMS with its limited range of application.

The requirements of development cost and of TCO will be further considered hereinbelow, which have not been sufficiently taken into account in the Prior Art.

Concerning the development cost, if each of advanced functions for every application is developed separately, the development cost thereof will be increased, resulting in the weakened competitiveness. Thus program modules (referred to as "module" hereinafter) should be developed with lower development cost and should achieve advanced functions designated for each of applications. Also the modules for achieving advanced functions are different in every application. If the common part of the advanced functions are extracted and shared, overlapped development of the common part of modules will not be required as well as the debugging of the common part of module will be eliminated, so that lower development cost will be realized. In addition, it is anticipated that the development cost will be further reduced in case where some mechanism, which may run a developed module in high speed, is provided, since the development time required for tuning of the module may be shortened.

With respect to the requirement of development cost, as can be seen, there are problems needed to be solved, as follows:

Providing storage with common part of sophisticated functions for a plurality of applications;

Achieving said common part with lower development cost;

Using said common part for achieving advanced functions for a plurality of applications;

Implementing protection when a common part is called by the advanced functions for a plurality of applications;

Implementing mutual exclusion when said common part is called by the advanced functions for a plurality of applications; and Providing a mechanism for faster execution of modules.

With respect to the requirement of the total cost of ownership, in order to take into account the fact that a plurality of storages may coexist on a network, there is problem to be solved as follows:

Distributing modules to plural storages if they exist.

SUMMARY OF THE INVENTION

Accordingly, the object of the present invention is to provide a method and apparatus for implementing extensible network-attached secondary storage by solving problems cited above to contiguously provide functions effective for a vast range of applications so as to enable the storage of next generation to be achieved.

Means for solving problems cited above will be now described hereinbelow.

In accordance with the present invention, a piece of data used by an application (i.e., object) is taken into consideration for the common part of advanced functions for a plurality of applications. Some examples of object include, for example, such data as a table, a record, and a column in a database system, a file in a filesystem, as well as a file in a specific file format for an application dealing with the specific file format on a filesystem. Method for placing an object data into a secondary storage is usually set for an application or a range of application, the number of which method is less than the number of advanced functions for every application. Accordingly, a module accessing to an object stored on the secondary storage (referred to as "object access module" hereinbelow) should be separated from a module implementing advanced functions (referred to as "function module" hereinbelow), and the interface therebetween should be explicitly defined.

In order to address to a vast range of applications, the extensibility of storage may be provided by enabling object access modules to be downloadable from a computer to storage. The object access modules may determine how to be stored in the secondary storage. Objects for an application may be retrieved from one or more of blocks in a secondary storage by using these modules. In such a way, the development cost of function modules for a vast range of applications may be reduced.

It should be understood that the objects referred in accordance with the present invention is not limited to such objects having simple structure, such as variable-length data present in a contiguous blocks. It should also be understood that objects in general exists in a plurality of non-contiguous blocks, and that references between blocks are also present. For example, in the filesystem described in the paper by Uresh Vahalia, "UNIX Internals: The New Frontiers", pp. 262-266, 1996, Prentice-Hall; hereinafter reference #7), one file may be linked by using inter-block reference of one, two or three levels. B-trees and hash tables, which are used by preference in the index of database, are also complex objects including multilevel inter-block reference.

The development cost may be reduced by writing in the declaration the declarative part of the way to store objects in a secondary storage (in which part of which block and in which order the object is stored). Thus in accordance with the present invention, object description data is introduced, which describes declaratively the way to store objects in secondary storages.

By enabling the object description data to be downloadable from a computer to storage, the extensibility of storage may be provided while object-basis accesses may be achieved with lower development cost.

In accordance with the present invention, the reduction of development cost may be possible with function modules achieved by using the functions of object access modules. By enabling the function modules to be downloadable from a computer to storage, the extensibility of storage may be provided while sophisticated functions for each application may be achievable.

Since the object access module is shared, it is likely to be stable. On the other hand, since a function module is specific for each application or for each advanced function, it is likely to be time-consuming until debugged to be stable. By taking this fact into consideration, in accordance with the present invention, a module, which protects the use of object, access modules from a function module (protection module) will be introduced.

By enabling the protection module to be downloadable from a computer to storage, protection may be provided while the extension for each of objects and for each of application programs may be achievable.

Mutual exclusion will be provided since it is likely to occur the case where function modules use a single object at the same time. Since there are inclusive relationships between objects (for example, a table, a record, and a column in a relational database are related in the way of inclusion in this order), the storage should provide a module implementing mutual exclusion (locking module), by taking into account the inclusive relation between objects in order to implement mutual exclusion of such a plurality of objects as cited above in away preferable.

By enabling the locking module to be downloadable from a computer to storage, mutual exclusion will be provided while the extension for each object or for each application program may be achievable.

In order to run modules in higher speed, a compiler should be provided in the storage or in a management computer.

In accordance with the present invention, a management computer, which manages the downloading of modules into a plurality of storages, will be provided so as to download modules into the storages after the processing of modules (typically a compilation) if required.

The foregoing and other objects, advantages, manner of operation and novel features of the present invention will be understood from the following detailed description when read in connection with the accompanying drawings.

BRIEF DESCRIPTION OF THE DRAWINGS

FIG. 6 is a schematic diagram illustrating the structure of active network storage;

FIG. 7 is a schematic diagram illustrating the structure of a module;

FIG. 8 is a schematic diagram illustrating the structure of an object access module using object description data;

FIG. 9 is a schematic diagram illustrating the structure of a protection module;

FIG. 10 is a schematic diagram illustrating the structure of an object description data (table form);

FIG. 11 is a schematic diagram illustrating an embodiment of the object description data (table form);

FIG. 12 is a schematic diagram illustrating the structure of an object description data (parser form);

FIG. 13 is a schematic diagram illustrating an embodiment of the object description data (parser form);

FIG. 14 is a schematic diagram illustrating the structure of object description data (pattern-matching type);

FIG. 15 is a schematic diagram illustrating the structure of protection policy;

FIG. 16 is a schematic flowchart illustrating the sequence of the object-based I/O using the object description data in table form;

FIG. 17 is a schematic flowchart illustrating the sequence of the object-based I/O using the object description data in parser form (1);

FIG. 18 is a flowchart illustrating the sequence of the object-based I/O using the object description data in parser form (2);

FIG. 19 is a schematic flowchart illustrating the process flow of foundObject used in the parser;

DETAILED DESCRIPTION OF THE PREFERRED EMBODIMENTS

An embodiment carrying out the present invention will be described in greater detail with reference to the accompanying drawings. For the sake of simplicity, the embodiment carrying out the present invention will be simply referred to as the "embodiment." Referring to FIG. 1 at first, the overview of the present embodiment will be described.

Figure 1:
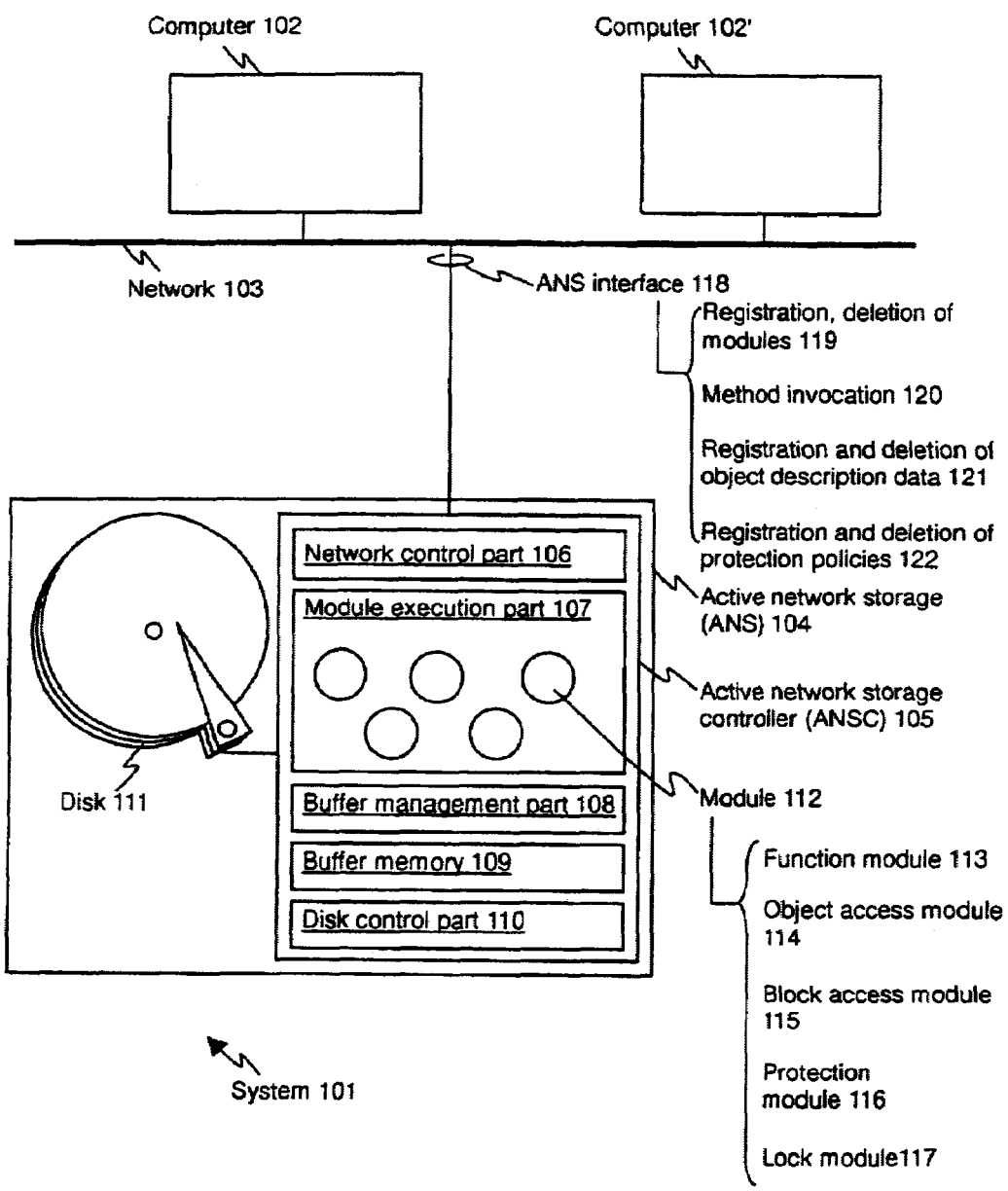
FIG. 1 is a schematic block diagram illustrating the overview of an embodiment in accordance with the present invention.
Figure 2:
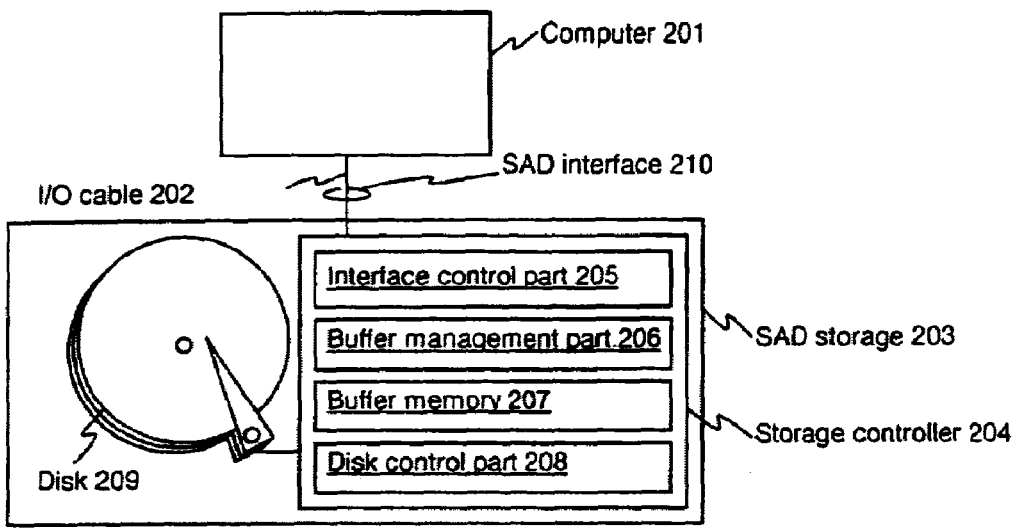
FIG. 2 is a schematic diagram illustrating the structure of a server-attached storage.
Figure 3:
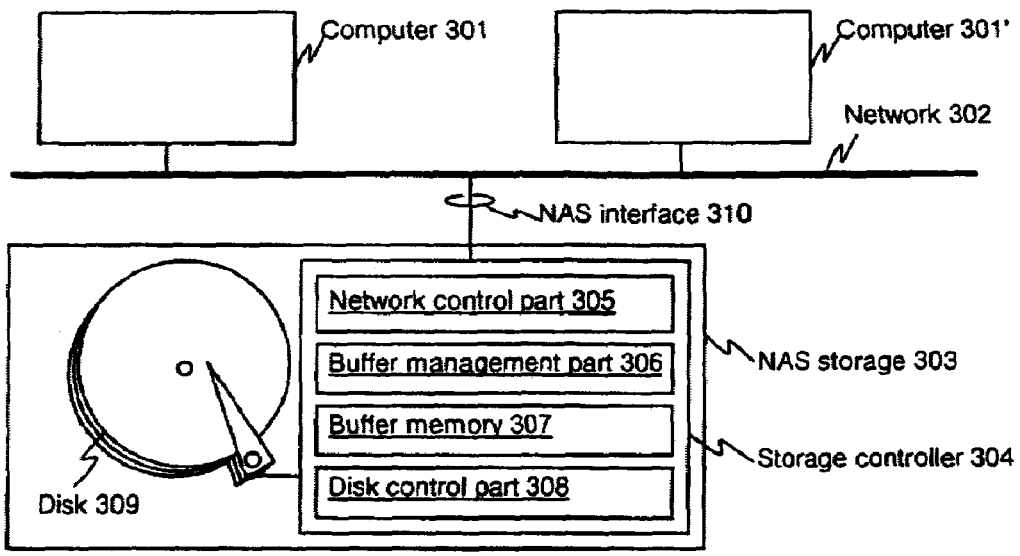
FIG. 3 is a schematic diagram illustrating the structure of a network-attached storage.
Figure 4:
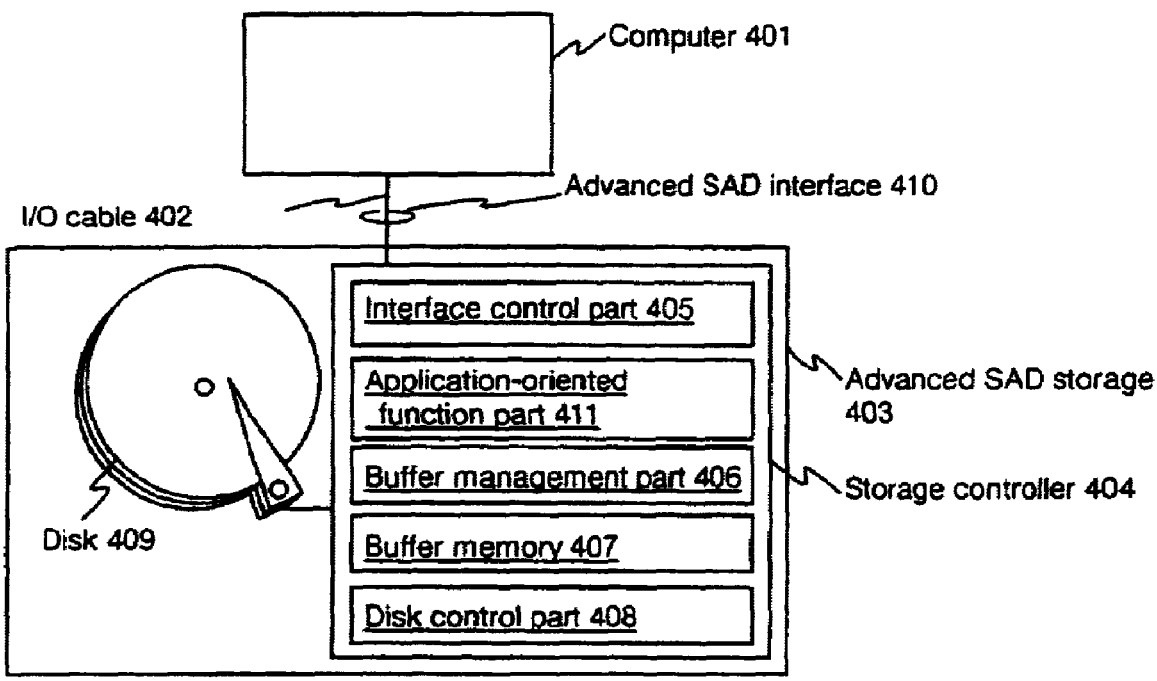
FIG. 4 is a schematic diagram illustrating the structure of a high-function server-attached storage.
Figure 5:
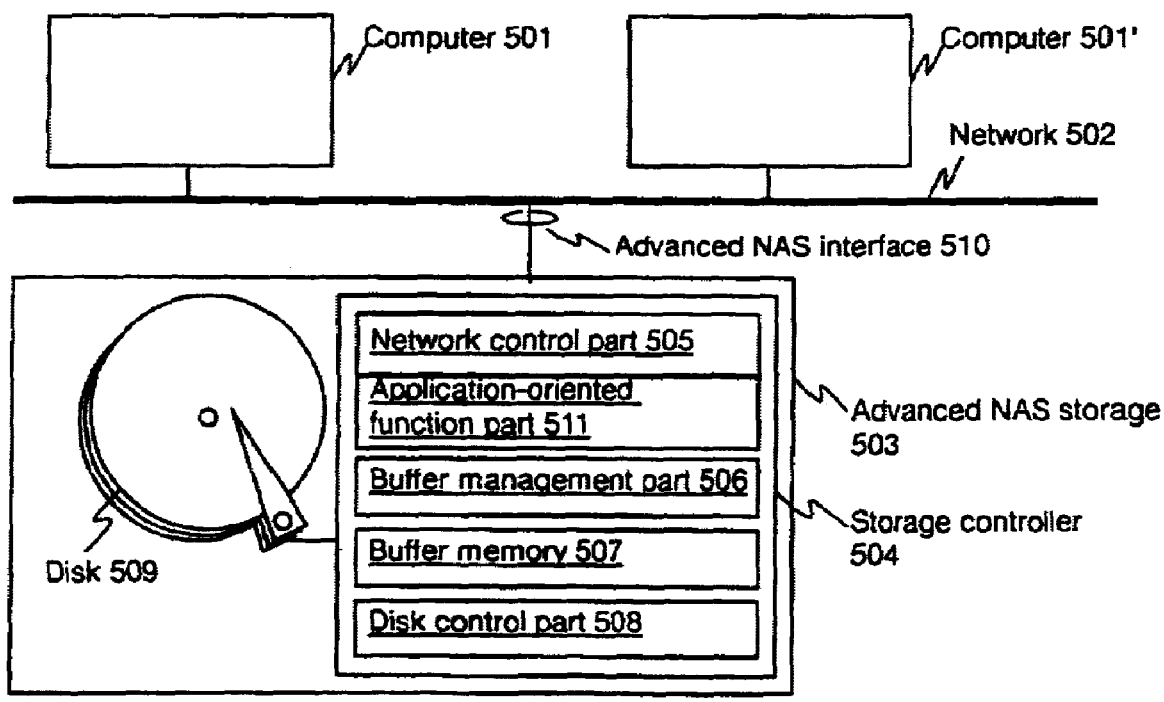
FIG. 5 is a schematic diagram illustrating the structure of a high-performance network-attached storage.

Referring to FIG. 1, the reference number 101 designates to a computer system preferable to the present embodiment. The system 101 comprises a network 103, one or more of computers 102, 102', . . . interconnected by the network 103, and one or more of active network storage (ANS) 104.

The network 103 may be a LAN (local area network) used in an organization or in one working group thereof (here an organization may be an enterprise, a school, or a similar corporation). Also, the network 103 may be part of WAN (wide area network) or WAN itself, which may interconnect a plurality of geologically dispersed points. In addition, the network 103 may be an interconnection network between computers, or a network interconnecting processors within parallel computers. The network 103 may be an I/O cable (such as SCSI cable) connecting a computer and an ANS 104.

Computers 102, 102', . . . may be comprised of arbitrary computers, such as personal computers, workstations, parallel computers, mainframes, or portable computers.

The number and the arrangement of computers 102, 102' . . . , network 103, and ANS 104 as shown in FIG. 1 are for the purpose of illustration and should not be considered to limit the scope of the present invention.

The ANS 104 is an extensible secondary storage. The ANS 104 is comprised of one or more of disks 111 and an active network storage controller (ANSC) 105.

The disk 111 is a storage medium (secondary storage), which may retain data after shutdown of power. Although there are many designations such as sector, or track, for the unit of data storage in the disk 111, the data storage unit in this specification will be referred to as "block." The disk 111 is comprised of a plurality of blocks, and may perform input/output in block-basis. If the secondary storage is a hard disk, size of a block is 512 bytes or 4 K bytes of fixed length in many cases. If the disk 111 is a hard disk for a mainframe, block size may be either fixed length or variable length. If the disk 111 is another type of secondary storage such as a tape drive, the block size of that secondary storage is specified by the device. It should be noted that in case of a certain secondary storage that may provide I/O interface in byte-basis, instead of block-basis, the present invention might be applied by considering one byte as one block.

The ANSC 105 controls the ANS 104. The ANSC 105 is comprised of a network controller part 106, a module execution part 107, a buffer management part 108, buffer memory 109, and a disk controller 110.

The network controller part 106 receives I/O requests and other transmissions sent from external devices such as computers 102, 102', . . . through the network 103 and transmits the response to the requests, and other transmissions to the network 103. The module execution part 107 achieves many functions provided by the ANS 104. The details of functions will be described later. The buffer management part 108 controls the buffer memory 109. The buffer memory 109 temporarily stores data obtained from the disk 111. The disk controller 110 controls the disk 111 to block read from and block write to the disk. The network controller part 106, the buffer management part 108, the buffer memory 109, the disk controller 110 are well known in the Prior Art therefore will not be described further in greater details.

The functions provided by the module execution part 107 may be classified into four types as block-basis I/O, object-basis I/O, advanced function for each application, and other functions.

The storage has been provided the block-basis I/O to computers. The main function of the block-basis I/O are to read data from a block (to read data from a block corresponding to the specified at least one block number so as to answer the computer), and to write data to the block (to write data to a block corresponding to the specified at least one block number to be written).

Object-basis I/O is to read/write a whole "object" as described later or part thereof. An object is a piece of semantic data to be stored to storage by an application program run on the computers 102, 102'. The definition of object may differ from one application to another, or from one field of application to another. Some examples of object includes, such data as a table, a record, and a column in a database system, a file in a filesystem, as well as a file in a specific file format for an application dealing with the specific file format on a filesystem.

The advanced function for each application is I/O process defined by an application program when needed. Some examples of the advanced function include, for example, sorting, image processing, and basic operations in a database system (such as selection processing, projection processing, concatenation, aggregation processing, and so on).

Other functions include, for example, initialization, backup, and copy of the disk 111.

The module execution part 107 implements the functions as above cited by combining one or more program modules 112, 112', 112" . . . . The modules 112, 112', 112", . . . may be classified into function module 113, object access module 114, block access module 115, protection module 116, and locking module 117, according to the function provided. A new type of module may additionally be defined.

The function module 113 implements the advanced function for each application as cited above. There may be single or plural modules according to the type of advanced function. The object access module 114 implements object-basis I/O as cited above. There may be single or plural modules according to the type of object. The block access module 115 implements block-basis I/O as cited above. There may be single or plural modules according to the type of block. The protection module 116 implements protection by selectively allowing or denying calls between modules. There may be single or plural modules according to the type of protection. The locking module 117 implements mutual exclusion of object-basis. There may be single or plural modules according to the type of mutual exclusion.

The ANS interface 118 interfaces between ANS 104 and external devices such as computers 102, 102' . . . In order to perform advanced function for each application, object-basis I/O, block-basis I/O, and protection, the interface includes registration/deletion of modules 119, method invocation 120, registration/deletion of object description data 121, registration/deletion of protection policy 122.

The registration/deletion of modules 119 is an interface for registering the modules 112, 112', and 112", . . . to the ANS 104 from external devices and for deleting modules from the ANS 104. The method invocation 120 is an interface for invoking a specific function of the module registered to the ANS 104 to receive the response. A "method" is a process flow provided by a module, as described later. The registration/deletion of object description data 121 is an interface for registering to and for deleting from the ANS 104 an object description data, which is data describing how an object is stored in the secondary storage. The object description data will be described in greater details below. The registration/deletion of protection policy 122 is an interface for registering to and for deleting from the ANS 104 the protection policy, which policy is data describing the way of protection between modules implemented by the protection module 116. The protection policy will be described in greater details below.

The structure of the present embodiment has been described as above. Referring now to FIG. 6, the structure of ANS 104 and its typical operation will be described.

When an request of either registration/deletion of modules 119, method invocation 120, registration/deletion of object description data 121, or registration/deletion of protection policy 122 is transmitted from the network or I/O cable to the ANS 104, said request will be received by the network controller part 106 (601).

The network controller 106 will send the request to either the module execution part 107 or the buffer management part 108 according to the type of request (602, 615). The requests sent to the buffer management part 108 will be functions provided by the conventional SAD type storage, such as block-basis I/O of the method invocation 120. The requests sent to the module execution part 107 will be any other type of requests. In other words, the registration/deletion of modules 119, registration/deletion of object description data 121, registration/deletion of protection policy 122, and method invocation 120 except block-basis I/O will be sent to the module execution part 107.

In the module execution part 107, module management part 650 manages and executes a variety of modules. The registration/deletion of modules 119 will be dispatched by the module management part 650 to an appropriate module.

A method invocation request with respect to the advanced function for each application will be sent to a function module 651 to be processed (603). A method invocation request with respect to the object-basis I/O and the registration/deletion of object description data 121 will be sent to an object access module 652 to be processed (609). Among method invocation request with respect to the block-basis I/O, the requests that the buffer management part cannot directly deal with will be sent to a block access module 653 (611) The registration/deletion of protection policy 122 will be sent to the protection module 654 for processing (659). The module registration/deletion 119 will be processed directly by the module management part 650. In other words, in case of module registration, the module sent thereto will be saved in the module execution part 107 as a new module. In case of module deletion, the module specified will be deleted from within the module execution part 107.

The function module 651 uses the object-basis I/O function provided by the object access module 652 and the mutual exclusion function provided by the locking module 655 to implement advanced functions (605). The locking module 655 further uses function of the object access module 652 (608) to implement the mutual exclusion.

When the function nodule 651 uses the function of the object access module 652, the function module 651 invokes a method in the object access module 652. This method invocation will be at first sent by the module management part 650 to the protection module 655 to determine whether the invocation will be allowed or denied (604), if invocation allowed, the method invocation request will be sent to the object access module 652 (607).

The object access module 652 implements object-basis I/O by using block-basis I/O function of the block access module 653 (610).

The block access module 653 implements block-basis I/O by either transmitting a block retrieval request to the buffer management part 108 (613) or directly making reference and changes to the buffer memory 109 (614). The buffer management part 108 may be directly invoked, for example when the module management part 650 saves a modules (612).

The buffer management part 108 manages the contents of the buffer memory 109 (616). For example, it performs a block replacement of the buffer memory 109, invokes writeback processing of dirty blocks to the disk 111, transfers a block reference request with respect to the block absent in the buffer memory 109 to the disk controller 110 (617), and invokes a process for transferring a block from the disk controller 110 to the buffer memory 109 (618).

The disk controller 110 receives the block-basis I/O request to the disk 111 to actually drive the disk 111 to perform I/O (619).

The internal structure and typical operation of the ANS 104 have been described as above. The internal structure and operation of each type of respective modules, object description data, and protection policy will be now described in greater details below.

Referring now to FIG. 7, the internal structure and typical operation common to each module will be described.

The object access module 114, block access module 115, protection module 116, locking module 117 have a common structure as shown in FIG. 7.

The module 701 contains one or more of methods 702, more than zero variable (attribute, 703). When receiving a method invocation 704 from another module in the module 701 or from outside, a corresponding method will be run. Method 702 refers and changes its attribute 703, or invoke a method 705 of another module to proceed the process.

In case of a function module, the advanced function for each application will be provided as methods to outside and other modules. Method used by the function module includes methods in the object access module and in the locking module.

In case of object access module, object (and its some part) will be specified as a method to provide to outside and other modules the method of referring to and changing its contents.

More specifically, getObject(Object) {specifying an object to refer to the whole contents of that object}, getobject(Object, offset, size) {specifying an object, the number of bytes from the top of the object, and the number of bytes of the target to refer to the specified data}, getobject(Object, tag1, tag2 . . . ) {specifying an object, and tag(s) pointing to the portion to be retrieved to refer to the specified data}, getObject(Object, i, j, k . . . ) {specifying an object and index pointing to the portion to be retrieved to refer to the specified data}, and getNextObject(Object) {referring the next part of the specified object} will be provided as method referring to part of an object. Tags will be described later with reference to FIGS. 10, 12, and 14.

Also, setObject(Object, data) {specifying an object to change the whole contents of that object}, setObject(Object, data, offset, size) {specifying an object, the number of bytes from the top of the object, the number of bytes of the target to change the specified data}, setObject(Object, data, tag1, tag2 . . . ) {specifying an object, tag(s) pointing to the portion to be changed to change the specified data}, setObject (Object, data, i, j, k . . . ) {specifying an object and index pointing to the portion to be changed to change the specified data}, and setNextObject(Object, data) {changing the next part of the specified object} will be provided as methods for changing objects. These methods will be implemented by using methods in the block access module.

In addition to the above mentioned methods, in case where said object access module uses the object description data, addObjectDescription(desc) and deleteObjectdescription(desc) will be provided, for registering and deleting an object description data, as will be described later.

In case of the block access module, block referring method and block changing method will be provided to outside and other modules as methods. More specifically, getBlock(blockID) {specifying a block number to refer to that block}, and setBlock(blockID, data) {specifying a block number to change that block} will be provided.

In case of the protection module, getProtection(source, dest, method) will be provided for the module management part, which method determines whether or not a method invocation is allowed or denied according to the given specification (source, destination, method) of said method invocation. In addition, in case in which said protection module can register or delete a protection policy, a method addProtectionPolicy(policy) and deleteProtectionPolicy (policy) for registering and deleting respectively a protection policy description data will be provided, as will be described later.

In case of the locking module, lockObject(Object, lock_mode) for locking an object, unlockObject(Object, lock_mode) for unlocking an object, addobjectRelationship(Object, Object) and deleteobjectRelationship(Object, Object) for registering and deleting respectively the containment relationship between objects will be provided for external and other modules.

Referring now to FIG. 8, the internal structure and typical operation of a module using object description data, among object access modules, will be described.

The object access module using object description data also contains one or more of methods 802 and more than zero attribute 803 in the module 801. The method 802 will be invoked by the method invocation 804 to refer to and change an attribute 803, or to proceed a process by a method invocation 805 of another module. The object access module using object description data retains the object description data 806 in the method 802, registers or deletes the object description data 806 in response to object description data registration/deletion 807. The structure and usage of object description data 806 will be described later by referring to FIGS. 10, 12 and 14.

Referring now to FIG. 9, the internal structure and typical operation of a protection module will be described.

The protection module contains in the module 901 a protection check part 902 and a protection policy 903. The protection check method 904 invokes protection check module 902, and method invocation will be allowed or denied with reference to the protection policy 903. The protection module responds to the registration and deletion of protection policies 905 to register or delete a protection policy 903.

Now the object description data will be described. There are three different types of object description data in the present embodiment. The first type is table form, which is preferred if the data string sequence within a block or between blocks is fixed (or such object portion). For example, this form may be advantageous for a file in a filesystem, and an index of a database system.

The second type of the object description data of the present invention is parser form, which describes the data sequence within a block or between blocks by using context free grammar. This type of object is preferred if the data string sequence within a block or between blocks has relatively large degree of freedom (or such object portion). This form may be advantageous for example, for a table in a database system, or a directory in a filesystem.

The third type of the object description data is pattern matching. The pattern-matching type determines a file format based on whether data in a specified part of a block or an object has some specific value or pattern. This type is preferred if some objects of the same structure may contain data of different format. For example, this form may be preferred when image files in a plurality of file formats are stored in a file in a filesystem and it is desirable to switch advanced functions according to the file format.

Referring now to FIG. 10, the structure of object description data in the table form will be described.

The object description data (table form) 1001 is a table containing six elements, i.e., a tag 1002, type 1003, offset 1004, size 1005, count 1006, and block type 1007. From this table the sequence of data within a block and between blocks can be obtained. A single row indicates a piece of semantic data in a block.

The tag 1002 is the name given to a piece of semantic data. This name is used for accessing to this data. The type 1003 indicates the type of said data. The offset 1004 indicates from which byte from the top of the object the data is stored. The size 1005 indicates the number of bytes of the data. The count 1006 indicates the total number of the data when the data is successive. The block type 1007 indicates the type of block number pointed to by the data when the data is block number pointing to another block.

Referring now to FIG. 11, the usage of the object description data in table form will be described.

In this example, a file in a filesystem described in the reference #6 will be described as a series of objects. The file in said filesystem is comprised of five different types of blocks. First, UFS_inode object 1101 is an object storing meta data of said file. It is shown comprised of di_mode, di_nlink, di_uid, di_gid, di_size, di_addr1, di_addr2, di_addr3, di_addr4, di_gen, di_atime, di-mtime, and di_ctime. For example, when considering di_mode, it is short type, occupies 2 bytes from the top 0th bytes of the object, and repeats for once. As another example, when considering di_addr1, it is BLOCK type (i.e., block number pointing to another block), occupies three bytes from the 12th bytes of the top of the object, and repeated for 10 times, and the block referenced to by this element is UFS_data object 1102.

UFS_data object 1102, UFS_indirect1 object 1103, UFS_indirect2 object 1104, UFS_indirect3 object 1105 are described in the figure in a similar manner. These objects define a structure of a file containing zero to three steps of indirect reference.

Referring now to FIG. 12, the structure of the object description data in parser form will be described.

The object description data (parser form) 1201 is a table containing four items, i.e., tag 1202, initialization code 1203, context 1204, and code 1205. From this table, a parser for parsing blocks will be constructed to parse blocks to obtain data sequence within a block and between blocks.

The tag 1202 is the name given to a piece of data. The initialization code 1203 is an instruction string to be executed before parsing of the data. The context 1204 specifies the context to be parsed. In accordance with the method of specification of the present embodiment, context free grammar and somewhat extended description will be allowed. The code 1205 is an instruction string to be executed after parsing of the context.

Referring now to FIG. 13, the usage of the object description data in parser form will be described.

Table definition 1301 indicates an example of table definition in a database system. This defines a customer table of three columns, c_id, c_name, and c_address.

Grammar 1302 is an object description data of the customer table corresponding to the table definition 1301. The table in this example is in five rows, defining in each row customer( ) for parsing the entire table, record( ) for parsing a row, c_id( ) for parsing c_ids, c_name( ) for parsing c_names, c_address( ) for parsing c_addresses. For example when considering record( ), it is indicated in the context section that "one row contains at the beginning data of long type indicating the size of record, then following c_id, c_name, and c_address." In the code section is shown a process for declaring the detection of a row by calling foundObject method when finishing the parsing of record. By using this table definition 1301 each row/column in the customer table may be detected. It should be noted that although not used in this example, the target block to be processed might be switched by using switchBlock (blockID) method in the code 1205.

Referring now to FIG. 14, the structure of object description data in pattern-matching type will be described.

The object description data (pattern-matching type) 1401 is a table containing three items, i.e., file format 1402, tag 1403, and pattern 1404. More than one set of tag 1403 and pattern 1404 correspond to one file format 1402. The file format 1402 is the name given for a file format. The tag 1403 is the name of apiece of data of part of an object, said name given by another object description data. The pattern 1404 is the pattern for performing the pattern matching with the data indicated by the tag 1403.

In case where all the pairs of the tag 1403 and pattern 1404 corresponding to the file format 1402 are matched, an object is determined to be in the file format given in the file format 1402.

For example, in the first and second line of FIG. 14, if the data tagged as "header1" in an object is "#!" AND the data tagged as "header2" is "/bin/sh" then this object will be determined to be a shell_script.

Referring now to FIG. 15, the structure of protection policy will be described.

The protection policy is data that the protection module retains for selectively allowing or denying calls between modules. The protection policy description data 1501 is comprised of sender 1502, receiver 1503, method 1504, and allow/deny 1505.

The sender 1502 is the sender of method invocation, the receiver 1503 is the receiver of method invocation, the method 1504 is the name of method to be invoked, and the allow/deny 1505 is either "allow" or "deny". The protection module verifies the sender, receiver, and method against the sender 1502, receiver 1503, method 1504 of the protection policy description data 1501 when invoking a method to determine to allow or deny said method invocation in accordance with the value in "allow/deny" 1505.

Referring now to FIG. 16, the sequence of the object-based I/O using the object description data in table form will be described.

As described above, there are some types of object-based I/O process. Now the sequence for implementing the operation of getObject(Object, "tag1", "tag2" . . . ) by using the object description data in table form will be described as a typical example. Other variants of the getobject implemented by using the object description data in table form may be implemented in a similar manner. getobject(Object, "tag1", "tag2", . . . "tagN") is a method, which refers the block pointed to by the tag1 at the top of the block in the object, then refers the block pointed to by the tag2 pointed to by the tag1, and finally refers the data met to the tagN.

A loop is formed from step 1601 to 1607. In step 1601, a line of the object description data the tag of which matches with the first tag will be searched. In step 1602, if second tag exists (Y), then control will be passed to step 1603, otherwise, if not then the process proceeds to step 1608. In step 1603, type 1003 of the search result line will be checked to see whether to be block type. If true (Y), then the control passes to step 1604, otherwise, if not (N) the process will be abnormally terminated. In step 1604, data having the length of size 1005 and starting from offset 1004 from the beginning of the target block to be processed (first block of the object for the first iteration) will be obtained. When obtaining the data, block-basis I/O provided by the block access module will be used as needed. In step 1605, data obtained in step 1604 will be set as the block number of the next target block to be processed. In step 1606, the object description data to be used will be switched to the object description data of the block type 1007. In step 1607, first tag will be discarded, and tag sequence starting from second tag will be shifted to left for one element. The process returns to step 1601 after step 1607. In step 1608, data having the length of size 1005 and starting from offset 1004 from the beginning of the target block will be obtained, in order to reply data as the return value of getObject( ). When obtaining the data, block-basis I/O provided by the block access module will be used as needed.

The process flow of object-based I/O using the object description data in table form has been described as above.

Referring now to FIG. 17, the sequence of the object-based I/O using the object description data in parser form will be described. In the description below, getobject(object, i, j, k . . . ) will be described.

In step 1701, the arguments i, j, k, . . . will be set to the target sequence. In step 1702, the object parser will be invoked so as to analyze the target block (first block of the object for the first iteration; the target may be changed to another block when the parse progress). The parser will terminate step 1702 if either the target sequence was detected by the parser or if parsed through the end of the object. In step 1703 the parser will detect the target sequence to determine whether or not the parsing has been successful. If true (Y) then in step 1704 the resulting parse data will be replied as the return value of the getobject( ), otherwise if not (N) the process will be terminated abnormally.

The process flow of getobject(object, i, j, k . . . ) using the object description data in parser form has been described as above.

Referring now to FIG. 18, the sequence of the object-based I/O using the object description data in parser form will be described. In the description below, getobject(object, "tag") will be described.

In step 1801, the "tag" argument will be set as the target tag. In step 1802, the object parser will be invoked so as to analyze the target block (first block of the object for the first iteration; the target may be changed to another block when the parse progress). The parser will terminate step 1802 if either the target sequence was detected by the parser or if parsed through the end of the object. In step 1803 the parser will detect the target sequence to determine whether or not the parsing has been successful. If true (Y) then in step 1804 the resulting parse data will be replied as the return value of the getobject( ), otherwise if not (N) the process will be terminated abnormally.

The process flow of getobject(object, "tag") using the object description data in parser form has been described as above.

Referring now to FIG. 19, the process flow of foundObject("tag", offset, size, i, j, k . . . ) invoked when parsing of part of the object has been successful within the object description data in parser form will be described. By combining foundObject( ) with getobject( ) shown in FIG. 17 or with getobject( ) in FIG. 18, object-based I/O using the object description data in parser form will be implemented.

In step 1901, getobject( ) will be checked to see whether or not the target tag set in getobject( ) matches with the "tag" argument. If true (Y) then the process flow proceeds to step 1903, otherwise if not (N) then the process flow proceeds to step 1902. In step 1902, the target sequence set in getObject( ) will be checked to see whether it matches with the arguments i, j, k, . . . If true (Y) then the process flow proceeds to step 1903, otherwise if not (N) then the process flow will be terminated. In step 1903, data having the length of size and starting from the offset from the beginning of the target block of getobject( ) will be obtained so as to set to the parse result. When obtaining the data, block-basis I/O provided by the block access module will be used as needed.

The process flow of foundObject( ) used in the parser has been described as above. As can be seen, object-based I/O, high-function I/O will be achieved by combining the modules to be downloaded to the ANS. The object description data describing declaratively the structure of object may be used for the object-based I/O. The development cost of modules thereby will be reduced.

Figure 20:
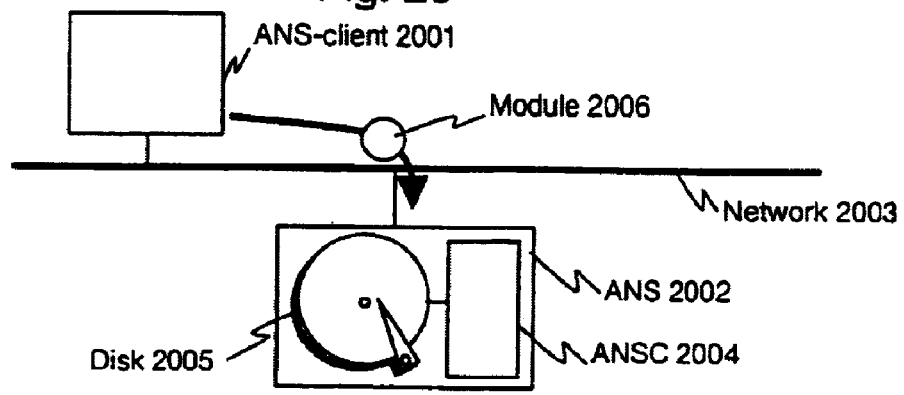
FIG. 20 is a schematic diagram illustrating the registration of a module from an ANS client computer into ANS.

Referring now to FIG. 20, the operation of module registration from ANS client computer to the ANS. ANS client 2001 will register module 2006 to ANS 2002 through network 2003. The ANS 2002 is comprised of, as mentioned above, ANSC 2004 and disk 2005. In this case it may not be essential but may be preferable to write module 2006 with one of any platform-independent languages such that the module 2006 becomes independent from the machine type of the ANS 2002. As platform-independent languages, there are many languages of choice including interpreter languages. In particular there are some languages, which may provide platform-independent executables, safe-type systems, and safe execution environment by recognizing the displacement through the network, these are preferable for writing the module 2006.

Such languages as those recognizing the displacement through the network may sometimes be less effective in execution performance than the ordinary compiler languages. In order to solve the problem, there are two alternatives: The first solution may be to provide a compiler within the ANS to recompile the module written in a language recognizing the displacement through the network to a faster executable, such as an executable written in machine language. In this case, compiling modules may be performed within the module management part 650.

The second solution may be to provide a computer outside the ANS with compilers for a plurality of types of ANS installed, to register modules to the ANS through this computer (ANS management computer). This alternative may be effective when it is difficult to install such large software as compilers to the ANS due to for example cost-performance ratio, or when a plurality of ANS does exist on the network.

Figure 21:
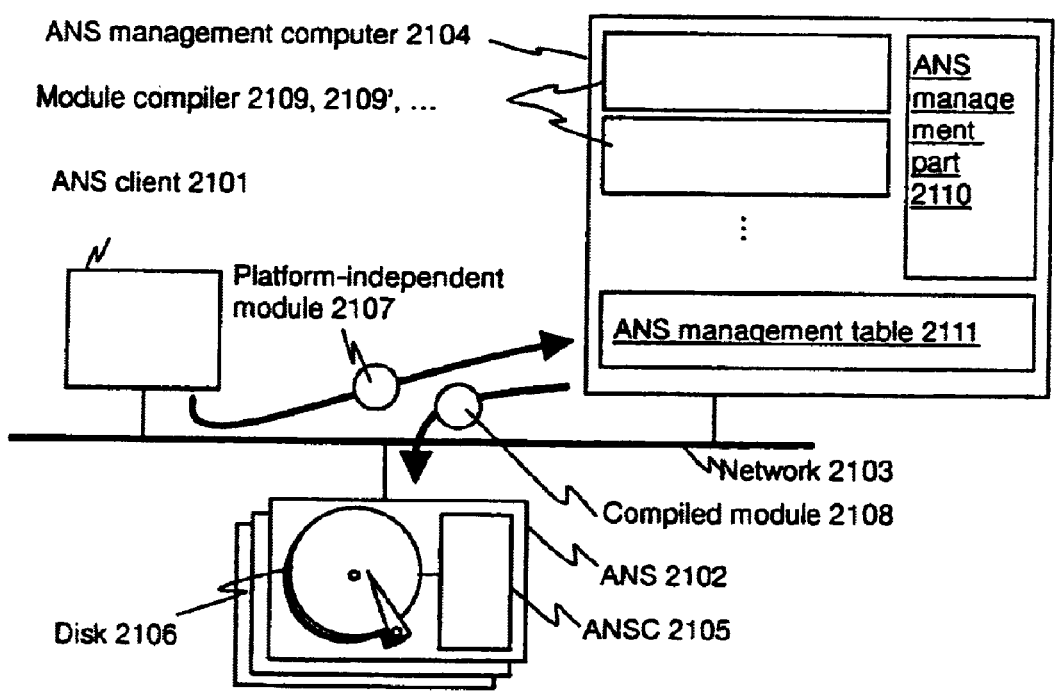
FIG. 21 is a schematic diagram illustrating the registration of a module from an ANS client computer into ANS, through an ANS management computer.

Referring now to FIG. 21, the operation of module registration from an ANS client to the ANS through the ANS management computer will be described.

An ANS client computer 2101 will send a platform-independent module 2107 through the network 2103 to ANS management computer 2104. The ANS management part 2110 of the ANS management computer 2104 will refer to ANS management table 2111 as described later to select one of module compilers 2109, 2109', . . . in accordance with the target ANS of the platform-independent module 2107. Then it will compile with said compiler the platform-independent module 2107 to obtain a compiled module 2108. In addition, the ANS management part 2110 will obtain the network address of the target ANS of the compiled module 2108 from the ANS management table 2111 to send the compiled module 2108 to the target ANS. The target ANS 2102 is comprised of ANSC 2105 and disk 2106 as have been mentioned above.

Figures 22, 23:
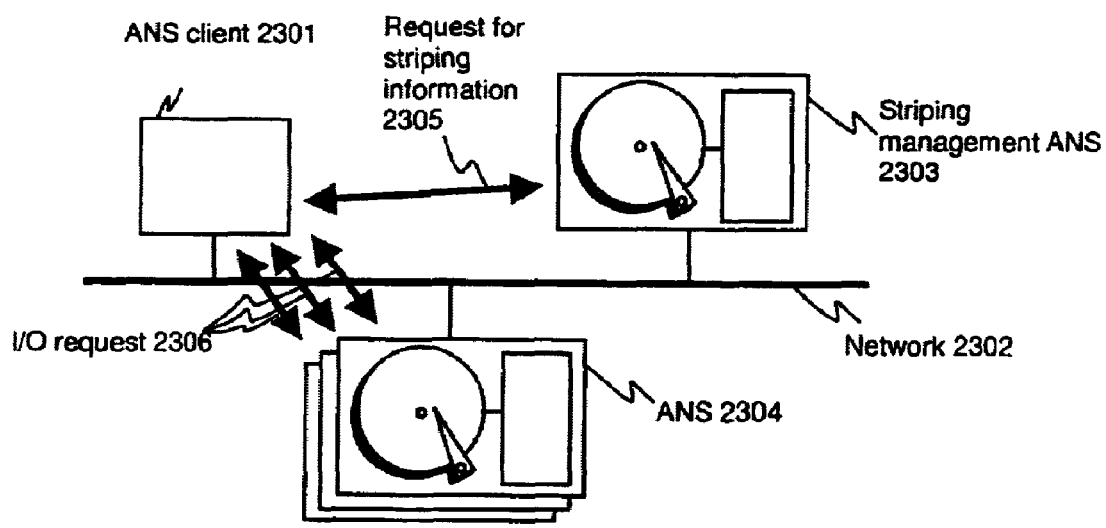
FIG. 22 is a schematic diagram illustrating an ANS management table.
FIG. 23 is a schematic diagram illustrating the structure of striping I/O by ANS.

Referring now to FIG. 22, the structure of ANS management table will be described.

ANS management table 2201 is comprised of four items, i.e., ANS name 2202, network address 2203, model 2204, and compiler 2205. The table maintains the relationships between a plurality of ANS network addresses, models, and module compilers. One row corresponds to one ANS.

The ANS name 2202 is the name of an ANS. The network address 2203 is the network address of the ANS. The model 2204 is the model name of the ANS. The compiler 2205 is the name of the module compiler used for compile modules for the ANS.

The structure of ANS management table has been described as above.

By using the ANS management computer 2104 having ANS management part 2110, ANS management table 2111, and module compilers 2109, 2109' . . . ANS will be achieved which may execute modules faster, and which will reduce management costs with respect to the compilation.

Referring now to FIG. 23, as an example of ANS, a method for implementing striping I/O from an ANS client computer to a plurality of ANS will be described below.

Faster I/O may be enabled by striping, that is, when ANS client computer 2301 performs I/O to a file, the file will be saved on a plurality of disks, resulting in that a plurality of disk I/O may be distributed to a plurality of disks. The striping may be achieved as follows.

When the ANS client computer 2301 reads or writes a file striped on a plurality of ANS 2304, it will transmit request for striping information 2305 to the striping management ANS 2303. At this time, the striping management ANS 2303 will reply to the ANS client computer 2301 with the striping information indicating the way that the file is striped on the ANS 2304 (information indicating which ANS stores which block of the file). This feature may be implemented as an object access module 114 of the striping management ANS 2303.

The ANS client computer 2301 then computes the ANS storing the part to read/write of the file based on the striping information to transmit I/O request 2306 to one or more of appropriate ANS. This two-step operation enables the striping I/O on a plurality of ANS to be implemented.

The striping has been heretofore implemented on the server, and the storage has been passive for receiving I/O requests from the server. With the method as mentioned above, the storage itself may implement the striping. This will result in the extensibility and interchangeability of the storage. For example, if a user who bought one storage intended to implement striping I/O to solve the bottleneck of the storage by adding another storage, in accordance with the conventional implementation of the striping on the server, he or she needs to buy a new server at the same time, resulting in expensive modification of storage. However, the method of the present invention provides advantages that no additional server is required, that striping may be readily implemented by preparing two storages and downloading the object access module 114.

The present invention provides a method and apparatus for implementing a storage directly connected to a network or providing advanced functions, comprising the steps of:

for reducing the development cost of modules, (a) Providing the storage with object access modules which performs I/O of a piece of data (object) used by applications as common part of the advanced functions for a plurality of applications;

(b) Providing object description data declaratively describing how the object is stored on a secondary storage;

(c) Enabling the advanced functions for a plurality of applications to be implemented by separating function module and object access modules to use object I/O function of the common part;

(d) Providing a module for protecting the use of object access modules from the function module (protection module);

(e) Providing a locking module for implementing mutual exclusion with the containment between modules being considered in order to perform appropriate mutual exclusion of a plurality of objects; and (f) Providing the storage or management computer with a compiler to implement the mechanism for faster execution of modules;

and for reducing the total cost of ownership when using a plurality of ANS, (g) Using a management computer for distributing modules among a plurality of storage present.

Although the present invention has been described in conjunction with several preferred embodiments thereof, it should be understood that these embodiments are disclosed by way of examples and the present invention is not to be limited thereto. It should be recognized that many changes and modifications may be made by those skilled in the art without departing from the true spirit and the scope of the present invention set forth in the appended claims.

What is claimed is:

1. A method for implementing an extensible network-attached storage in a system including a plurality of computers, at least one secondary storage apparatus having a storage medium, which stores data in units each being a block, in which said data is kept after shutting down a power source and an active network storage controller for inputting and outputting a block-based input/output (I/O) request between the computers and the storage medium, wherein at least one application program is deployed in one of the computers processing data in units each being an object, said application program issues object-based I/O requests to said secondary storage apparatus, said method comprising the steps of:

receiving an object-based I/O request from one of the computers;

downloading an object access module describing how a requested object is stored in the secondary storage apparatus to the active network storage controller from one of the computers;

implementing the object access module to convert the object-based I/O request to a block-based I/O request;

sending the block-based I/O request to the secondary storage apparatus;

receiving a response to the block-based I/O request from the secondary storage apparatus; and transmitting a response to the object-based I/O request.

2. A method according to claim 1, wherein said object access module obtains a data value or location of data in a storage unit corresponding to a specification, which is either an object, an object offset, an object offset size, or an object tag specifying the type of data to be retrieved.

3. A method according to claim 1, further according to claim 1, further comprising the steps of:

registering said object access module in said active network storage controller to provide the secondary storage apparatus with an object-based I/O function;

registering object description data, which indicates how application data is stored in the secondary storage apparatus, in the registered object access module; and receiving in said secondary storage apparatus from the computer an object-based I/O request for accessing said application data.

4. A method according to claim 3, wherein said object description data is data for specifying an attribute or an inter-block reference based on an offset and size of said application data.

5. A method according to claim 3, wherein said object description data is data for specifying an attribute or an inter-block reference by a lexical analyzing program or a parser generating grammar of said application data.

6. A method according to claim 3, wherein said object description data is data for specifying a file format of said application data based on whether the data stored in a specific part of one or more storage units contain some specific value or pattern.

* * * * *